(12) United States Patent
Tai

(10) Patent No.: US 7,434,771 B1
(45) Date of Patent: Oct. 14, 2008

(54) EXPANDABLE SUPPORT FOR SEWER OR DRAINAGE CONDUIT

(75) Inventor: Lo Yun Tai, Tuen Mun (HK)

(73) Assignee: Double Color Industrial Ltd., Hong Kong (CN)

( * ) Notice: Subject to any disclaimer, the term of this patent is extended or adjusted under 35 U.S.C. 154(b) by 132 days.

(21) Appl. No.: 11/599,064

(22) Filed: Nov. 14, 2006

(51) Int. Cl.
*F16L 3/00* (2006.01)

(52) U.S. Cl. .............................. 248/49; 248/75; 248/80; 248/81; 248/83; 248/89; 248/148; 248/150; 138/106; 16/262; 16/265; 16/268

(58) Field of Classification Search ................... 248/75, 248/80, 81, 83, 89, 49, 148, 150; 138/106; 16/262, 265, 268
See application file for complete search history.

(56) References Cited

U.S. PATENT DOCUMENTS

| | | | | |
|---|---|---|---|---|
| 1,159,372 A * | 11/1915 | Goff | ........................... | 248/237 |
| 2,170,557 A * | 8/1939 | Guarnaschelli | .............. | 285/61 |
| 2,537,703 A * | 1/1951 | Randa | ......................... | 248/75 |
| 2,966,332 A * | 12/1960 | Robinson | .................... | 248/150 |
| 3,572,662 A | 3/1971 | Smith | | |
| 4,082,242 A | 4/1978 | Smith | | |
| D257,221 S * | 10/1980 | Piesner | ......................... | D8/380 |
| 4,306,697 A * | 12/1981 | Mathews | .................... | 248/68.1 |
| 4,406,434 A * | 9/1983 | Schneckloth | ................. | 248/83 |
| 4,442,991 A * | 4/1984 | Levens | ....................... | 248/146 |
| 4,722,500 A | 2/1988 | Bray | | |
| 6,186,449 B1 * | 2/2001 | Chrestenson | ................. | 248/49 |
| 6,503,139 B2 * | 1/2003 | Coral | .......................... | 454/65 |
| 6,619,596 B1 | 9/2003 | Caine et al. | | |
| 6,648,281 B1 * | 11/2003 | Lake | ........................... | 248/75 |
| 6,877,700 B2 * | 4/2005 | Smith | .......................... | 248/49 |
| 2007/0085361 A1 * | 4/2007 | Hauser | ...................... | 296/1.08 |
| 2007/0210215 A1 * | 9/2007 | Prest | ........................... | 248/80 |

* cited by examiner

*Primary Examiner*—Anita M. King
*Assistant Examiner*—Nkeisha J Dumas

(57) ABSTRACT

The supports of the present invention further comprise a frame strut extending across a lower portion of the support frame. Two openings are defined in the frame strut which are adapted to receive ends of an expansion limiter piece. This limiter piece is generally V-shaped and has connection means at the end of each of the V legs for connection to frame struts of adjacent hose supports. The vertex of the limiter piece is located proximal to a vertex formed by the hinge of adjacent hose supports. At the vertex of the limiter piece and at locations near the connection means, living hinges are formed so that a user will experience relatively little resistance to opening, accordion-style, the invention hose supports.

7 Claims, 7 Drawing Sheets

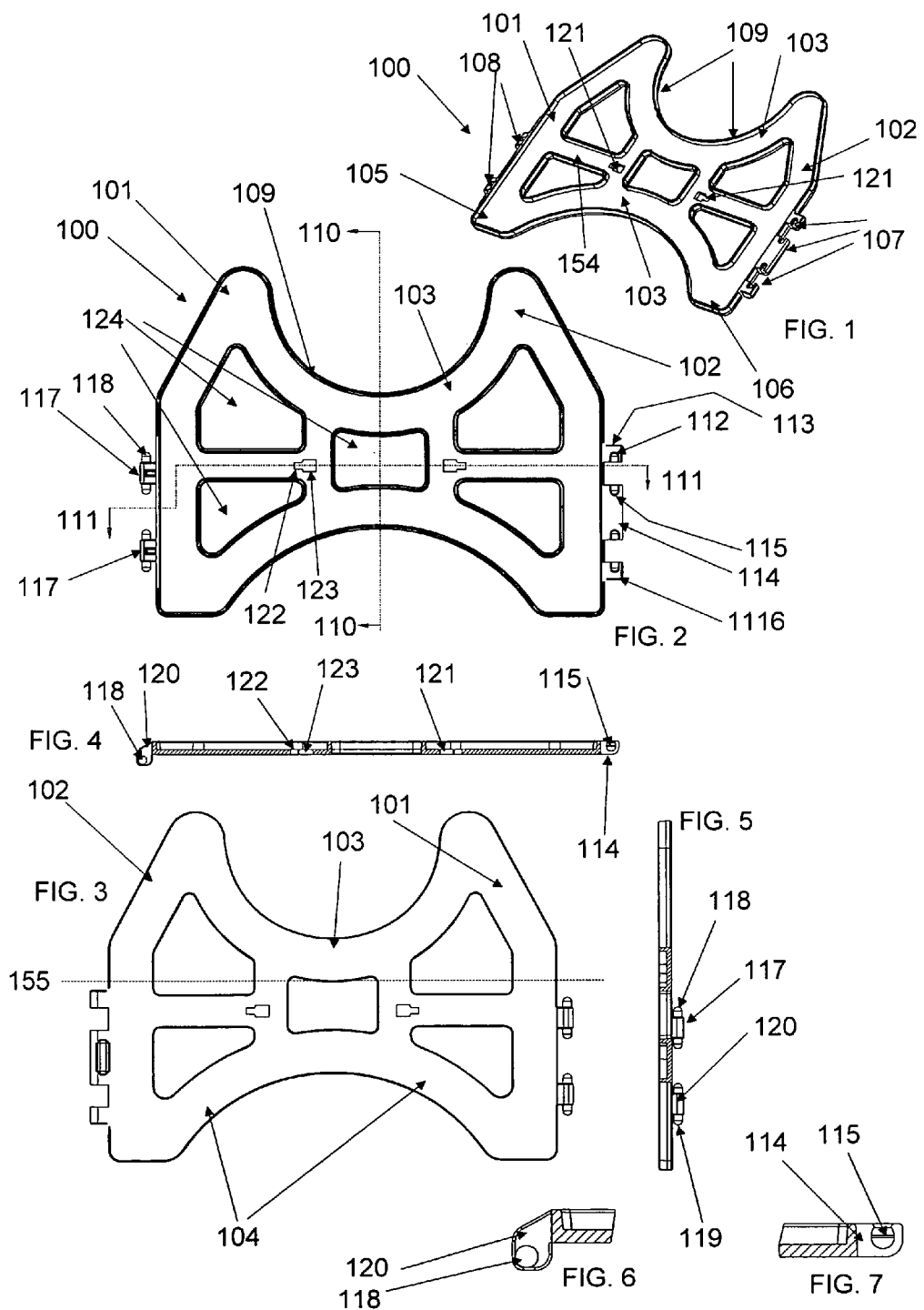

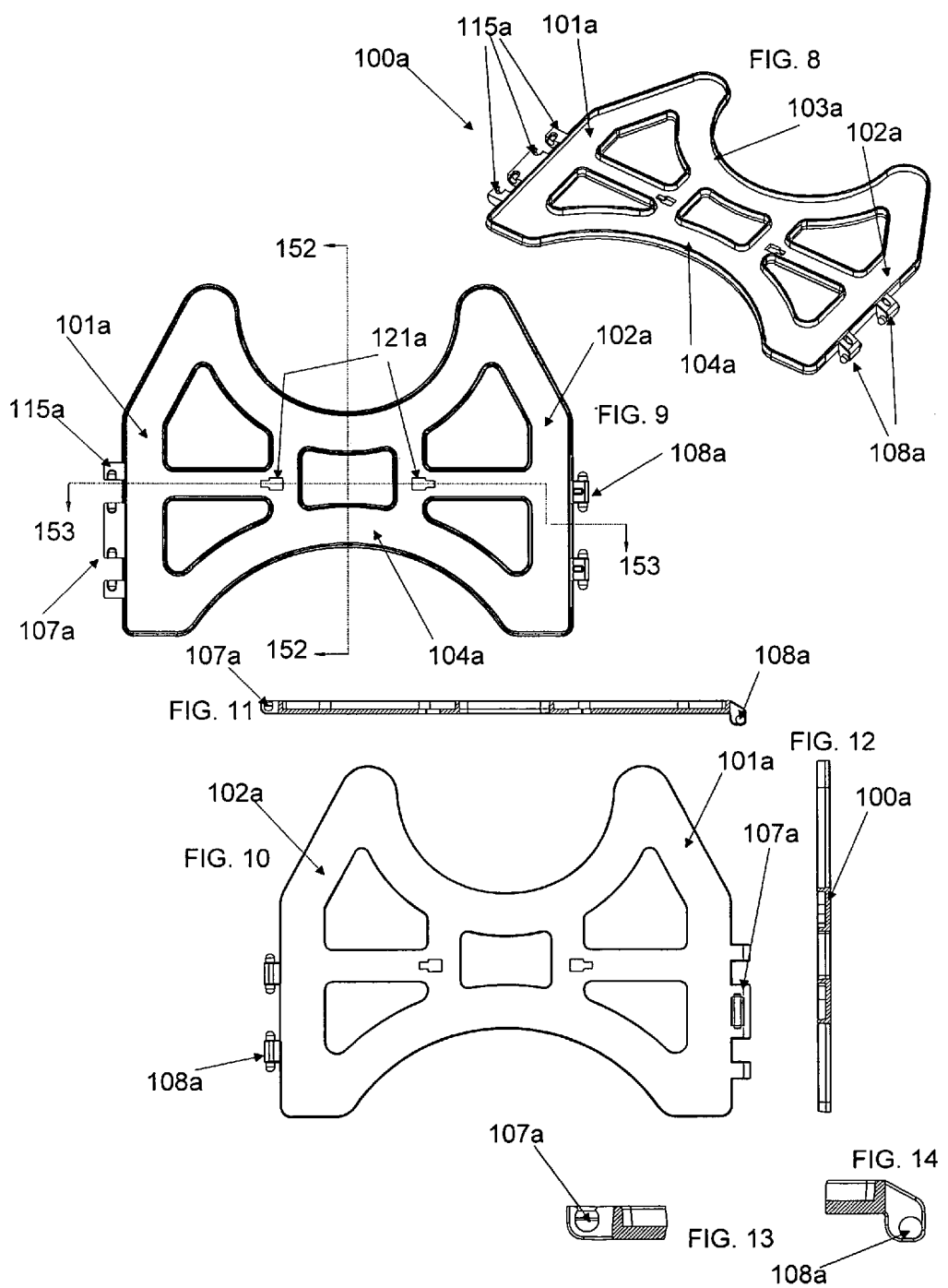

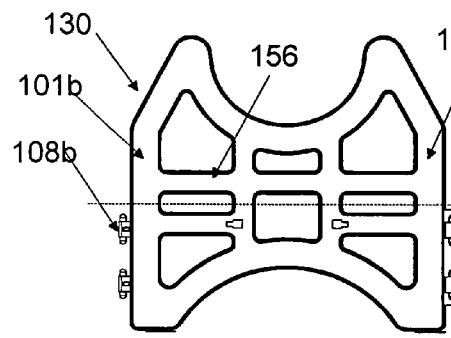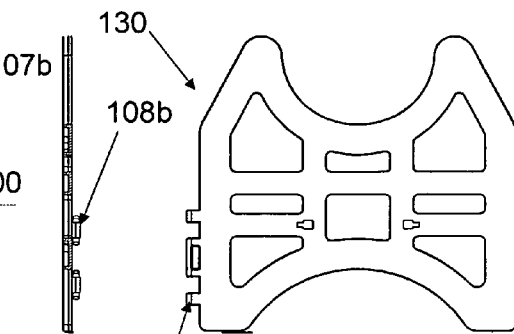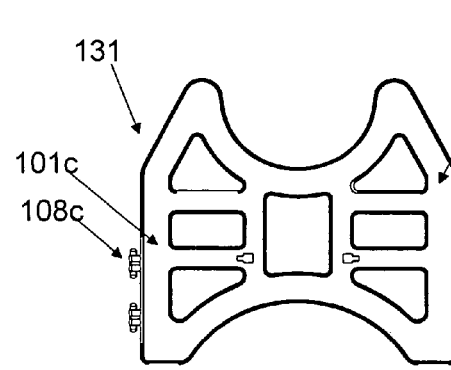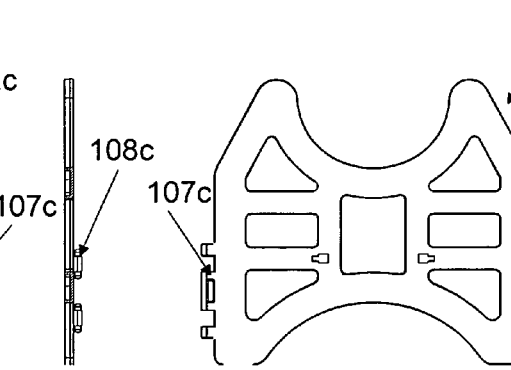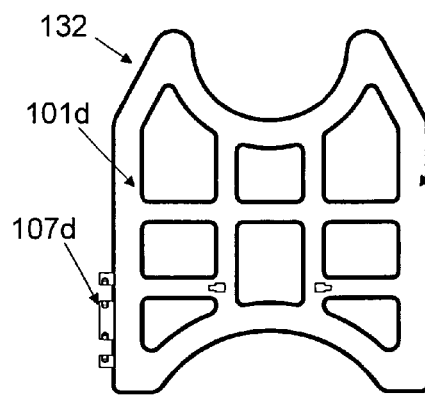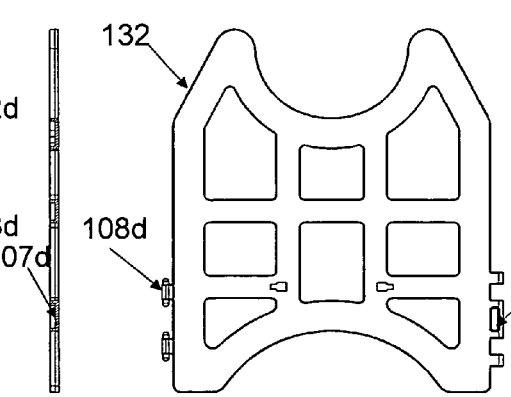
FIG. 17   FIG. 18   FIG. 19
FIG. 20   FIG. 21   FIG. 22
FIG. 23   FIG. 24   FIG. 25

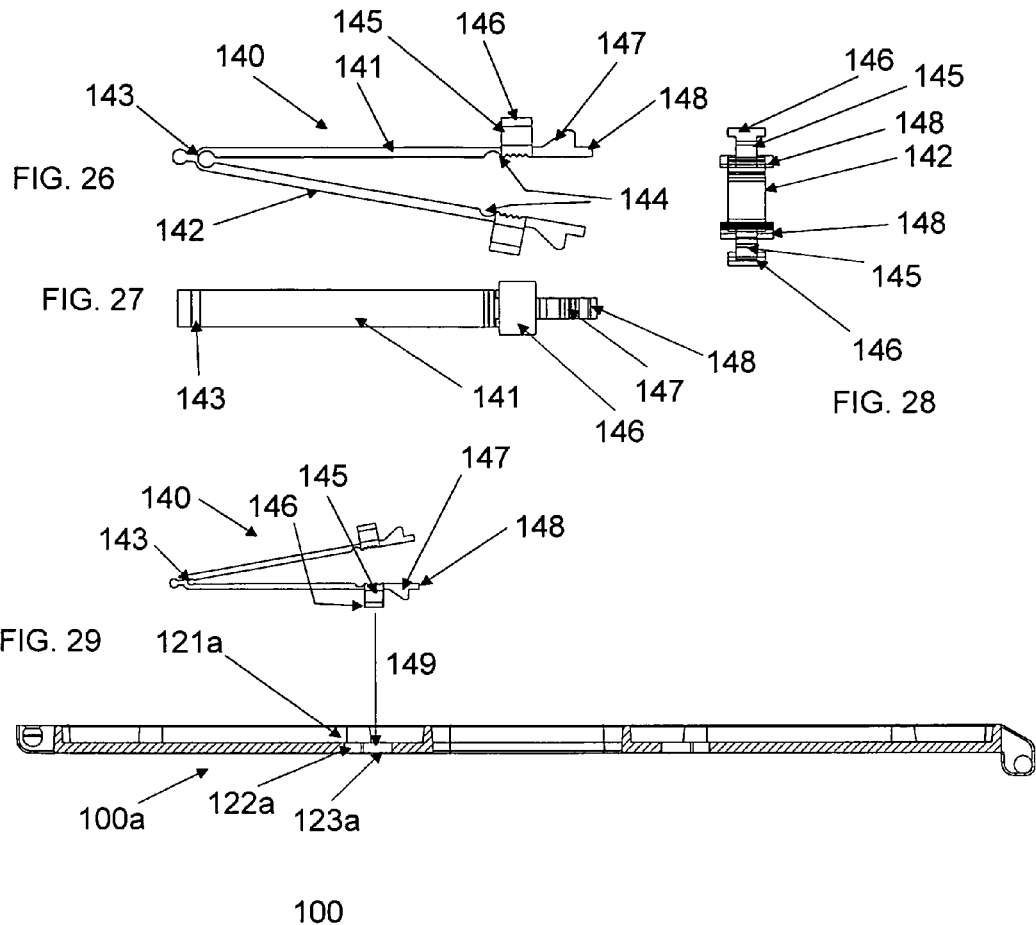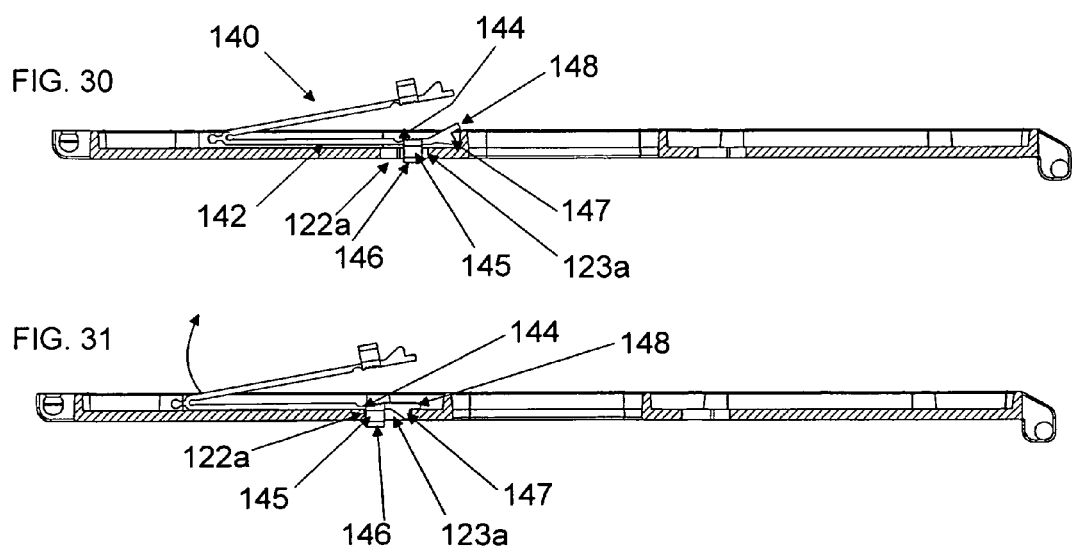

EXPANDABLE SUPPORT FOR SEWER OR DRAINAGE CONDUIT

FIELD OF THE INVENTION

The present invention relates to a support for a flexible sewer hose which attached to a sewage tank at a recreational vehicle and drains to a disposal tank some distance from the recreational vehicle.

BACKGROUND OF THE INVENTION

Recreational vehicles are usually provided with a storage tank for retaining waste water and sewage until it can be disposed of in an acceptable manner. One such disposal method has been for a recreational vehicle owner to locate their vehicle close to a sewage hose stub conduit, where said stub conduit is joined to a septic system. A user is provided with a flexible, collapsible hose or circular conduit which sealingly connects with a valve connection on the sewage tank. The user must draw out the collapsible hose until it can be connected with the stub conduit. Thereafter, the user opens the valve on the sewage tank and the waste liquids and solids drain into the available sewage system.

It was recognized very early in the art that the waste liquids and solids required a continuous incline down from the valve connection to the ground elevation of the stub conduit to provide for effective drainage from the sewage tank. U.S. Pat. Nos. 4,082,242, 4,722,500, and 3,572,622 disclose various methods for supporting the flexible hose and provide the continuous incline therefor. U.S. Pat. No. 6,619,596, which is incorporated herein, disclosed a set of hinged supports that open and close, accordion-style, from a closed to an expanded position. The hinges of the supports are provided with stops that prevent the supports from opening to an angle greater than appropriate for retaining the flexible hose in their U-shaped cradles.

SUMMARY OF THE INVENTION

The present invention comprises multiple sewer hose supports having a generally rectangular frame while defining on an upper portion a U-shaped cradle for supporting a lower portion of a flexible sewer hose. Each support comprises hinges on right and left edges so that they may be joined together for accordion-style expansion and compression similar to the manner of the supports described in the '596 patent.

The supports of the present invention further comprise a frame strut extending across a lower portion of the support frame. Two openings are defined in the frame strut which are adapted to receive ends of an expansion limiter piece. This limiter piece is generally V-shaped and has connection means at the end of each of the V legs for connection to frame struts of adjacent hose supports. The vertex of the limiter piece is located proximal to a vertex formed by the hinge of adjacent hose supports. At the vertex of the limiter piece and at locations near the connection means, living hinges are formed so that a user will experience relatively little resistance to opening, accordion-style, the invention hose supports. The '596 patent discloses that angular expansion limitation should be accomplished by way of wedge shaped inclusions upon the hinge edges of the hose supports. It has been found that substantial use of the assembled hose supports cause undue strain on the hinge itself, whereupon the polymer composition of the hose support hinge is necessarily weakened and the useful life of the hinge is substantially shortened.

By way of contrast, the present invention provides limiter pieces which are easily and cheaply replaced, thereby preserving the integrity of the polymer hinge of the hose support.

As in the '596 patent, the invention hose supports are molded in a single step of a lightweight, durable plastic. However, the hinges in the invention hose supports are formed at the same time as the main body. The invention hose support can be manually folded or unfolded as required in a simple, easy and efficient manner. Each hose support arch includes a deep cradle for securely containing the sewer hose during periods of rapid sewage flow and includes a leg affixed to each end of the cradle. In the assembled device, pairs of tallest, identical sized arches are connected to adjacent pairs of arches of lesser height. The tallest of the pairs are set near the recreational vehicle and the lowest drawn out to a position near the stub conduit. The invention device contains the flexible sewer hose in a continuous incline away from the recreational vehicle ensuring proper sewage flow.

It is an object of the invention to provide an accordion-style set of hose supports hinged together for supporting a flexible, expandable sewer hose for recreational vehicle where angular limitation on the expansion of the hose supports is made by way of a V-shaped limiter piece.

BRIEF DESCRIPTION OF THE DRAWINGS

FIGS. 1 through 5 are respectively front perspective, front, rear, section 110 of FIG. 2, and section 111 of FIG. 2 views of an invention hose support of a lowest elevation.

FIGS. 6 and 7 are respectively broken away and enlarged views of the left and right sides of the hose support of FIG. 4.

FIGS. 8 through 12 are respectively front perspective, front, rear, section 152 of FIG. 9, and section 153 of FIG. 9 views of an invention hose support of a lowest elevation.

FIGS. 13 and 14 are respectively broken away and enlarged views of the left and right sides of the hose support of FIG. 11.

FIGS. 17, 18 and 19 are, respectively, front, left side and rear views of a first increased height invention hose support.

FIGS. 20, 21 and 22 are, respectively, front, left side and rear views of a second increased height invention hose support.

FIGS. 23, 24 and 25 are, respectively, front, left side and rear views of a third increased height invention hose support.

FIGS. 26, 27, and 28 are, respectively, side, top and front views of an invention limiter piece.

FIGS. 29, 30 and 31 are, respectively, first, second and third steps showing the limiter piece of FIG. 27 being connected with a limiter opening in a support strut cross section of FIG. 11.

DETAILED DISCUSSION

Figure 15:
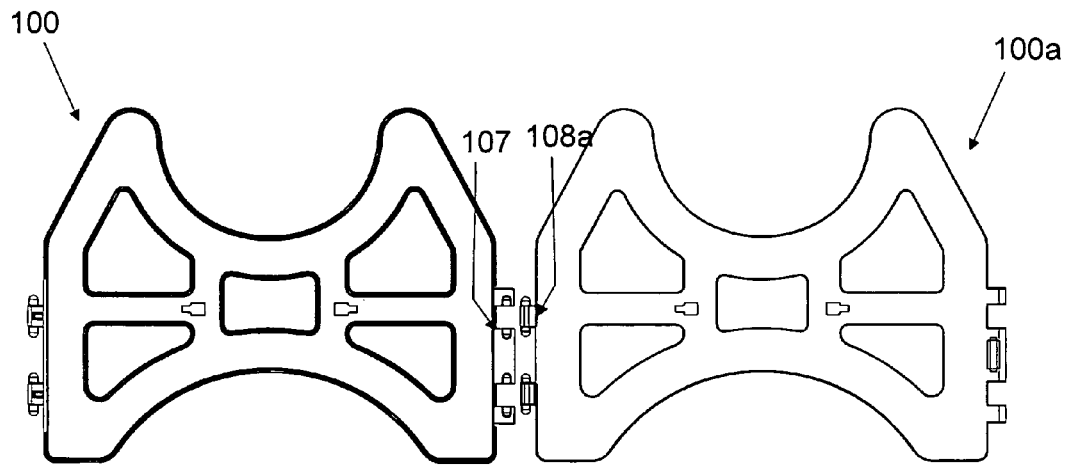
FIGS. 15 and 16 are, respectively, first and second steps for joining the hose supports of FIG. 1 and FIG. 8.

The invention is now discussed with reference to the figures.

FIGS. 1 through 5 are respectively front perspective, front, rear, section 110 of FIG. 2, and section 111 of FIG. 2 views of a first one of a pair of invention hose supports. In a preferred embodiment, hose support 100 is one of a pair of lowest elevation hose supports which would be located nearest a conduit stub when the assembled device is positioned by a user. FIGS. 17 through 25 show general structure of invention hose supports with increasing elevation structures, where the hose support of FIGS. 23, 24 and 25 represent one hose support 132 of a pair of hose supports which would be located nearest valve connection on a sewage tank of a recreational vehicle when the assembled device is positioned by a user.

Referring again to FIGS. 1 and 2, hose support 100 comprises a frame of left leg 101, right leg 102, bottom arch 104, and upper cradle 103, which forms hose support surface 109. Limiter openings 121 are defined in support strut 154, which extends from leg 101 to leg 102. Receiver hinge 107 comprises three elements 113, 114 and 116 which define snap fit cavities 112 and 115 for receiving adjacent hose support lugs 118 and 119 on lug flange 117 of lug hinge 108. A hinge connection between adjacent hose supports is made by impressing lugs 118 and 119 into snap fit cavities 112 and 115, whereupon such adjacent hose supports are secured together but may rotate freely about the formed hinge. Limiter openings 121 comprise an inwardly located large rectangular section 123 continuous with a smaller, laterally located rectangular section 122. FIGS. 3 through 7 show the already disclosed features.

FIGS. 8 through 12 are respectively front perspective, front, rear, section 152 of FIG. 9, and section 153 of FIG. 9 views of an invention hose support of a lowest elevation. Hose support 100a is the second of the pair of lowest elevation hose supports, the first of the pair being hose support 100 of FIG. 1. It will be noted that the hose support 100a of FIGS. 8 through 14 differ from hose support 100 of FIG. 1 only as to the location of hinge elements. The hose support 100a of FIGS. 8 through 14 comprises receiver hinge 107a on a left side while the hose support 100 of FIG. 1 comprises a mirror image receiver hinge 107 on the right side. Similarly, hose support 100a of FIGS. 8 through 14 comprises lug hinge 108a on a right side while the hose support 100 of FIG. 1 comprises a mirror image lug hinge 108 on the left side. Adjacent hose supports alternate the location of the receiver and lug hinges from right to left so that hinge connections can be formed between them.

Referring again to FIGS. 8 through 14, receiver hinge 107a is formed of elements 115a on a left leg 101a. Lug hinge 108a is formed in right leg 102a. Limiter openings 121a are formed in the support strut between leg 101a and 102a.

Figure 16:
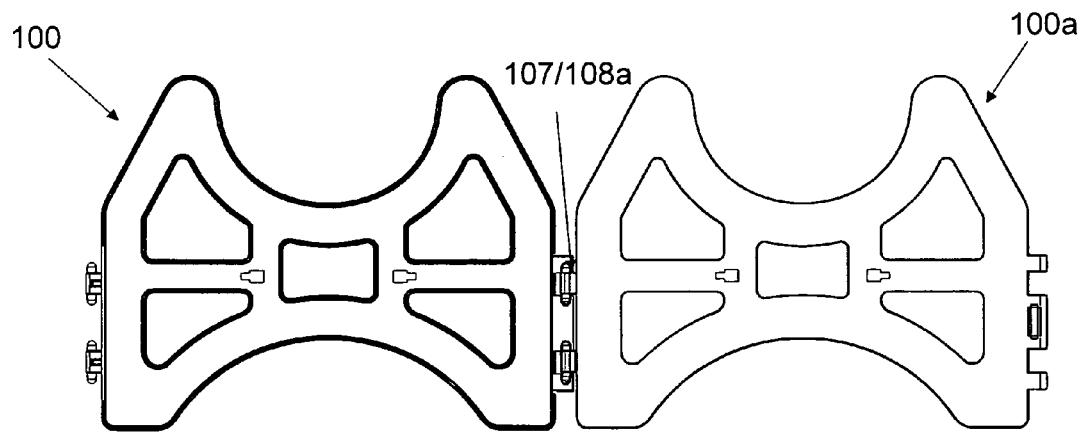

FIG. 15 shows a right side of hose support 100 (bearing receiver hinge 107) brought next to a right side of hose support 100a (bearing lug hinge 108a). FIG. 16 shows that the hose supports 100 and 100a of FIG. 15 are joined to form a hinge 107/108a.

FIGS. 17 through 25 show representative increased elevation hose supports which all are of similar structure below elevation 155 as the hose support 100 of FIG. 2. A support strut between right and left legs is added to provide structural support at increased elevation for the weight of flowing liquids and solids in the sewer hose.

FIGS. 17, 18 and 19 are, respectively, front, left side and rear views of a first increased height invention hose support 130 that comprises an added support strut 156 between legs 101b and 102b, which respectively bear lug hinge 108b and receiver hinge 107b. Limiter openings 121b are located in a lower support strut.

FIGS. 20, 21 and 22 are, respectively, front, left side and rear views of a second increased height invention hose support 131 that comprises an added support strut between legs 101c and 102c, which respectively bear lug hinge 108c and receiver hinge 107c. Limiter openings 121c are located in a lower support strut.

FIGS. 23, 24 and 25 are, respectively, front, left side and rear views of a third increased height invention hose support 132 that comprises an added support strut between legs 101d and 102c, which respectively bear receiver hinge 107d and lug hinge 108d. Limiter openings 121d are located in a lower support strut.

FIGS. 26, 27, and 28 are, respectively, side, top and front views of limiter piece 140, which comprises a V-shape with a living hinge 143 at a vertex, extending to two legs 141 and 142. Each leg 141 and 142 extend outward first with a narrow extension 145, which continues to a wider extension 146. Legs 141 and 143 further extend from the vertex to support lug 147, which extends in the direction as extensions 145 and 146. The end portions 148 of legs 141 and 14s are defined by living hinges 144 formed in legs 141 and 142 just proximal to the vertex from extension 145. It is intended that each of the two extensions 145 be lodged in a slot of the limiter opening defined in the lower support strut of the hose supports to secure each end of limiter piece 140 to adjacent hose supports, where the vertex of limiter piece 140 would directed toward a vertex formed by the hinge connection of the adjacent hose supports.

FIGS. 29, 30, and 31 are, respectively, first, second and third steps showing the limiter piece 140 being connected with a limiter opening in a support strut cross section of FIG. 11. FIG. 29 shows limiter piece 140 aligned so that leg 142 is substantially parallel, at a horizontal elevation, to a front side of hose support 100a, where extension 146 is directed at section 123a of opening 121a for insertion therein. Section 122a of opening 121a is too narrow to accept insertion of extension 146 as shown in FIG. 29.

FIG. 30 shows that a user has impressed extension 146 through section 123a so that extension 146 extends past the surface of the support strut on the other side of section 123a. In doing so, lug 147 causes end portion 148 to deflected outward, thereby resisting insertion of extension 146 in section 123a. FIG. 31 shows that a user has pressed limiter piece 140 in a left direction from the position shown in FIG. 30, thereby engaging extension 145 in the slot formed by section 122a and causing lug 147 to spring into the slot formed by section 123a, securing limiter piece 140 to hose support 101a. The steps shown in FIGS. 29 through 31 are repeated for the other leg of limiter piece 140 as to an adjacent hose support joined to the receiver hinge at the left of hose support 100a in FIG. 30. In this manner, limiter piece 140 prevents over expansion of the invention assembly when the hinged and adjacent hose supports are moved into an open position from their collapsed position.

Figure 32:
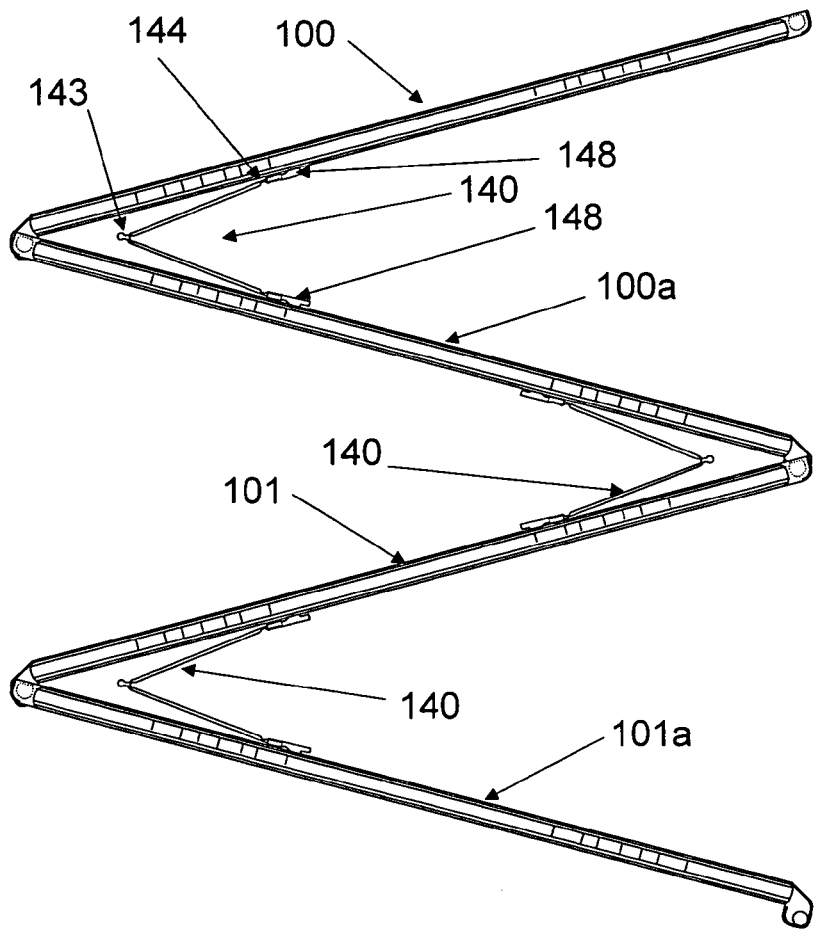
FIG. 32 shows a top view of four invention hose supports in hinged connection and limited in angular expansion around said hinge by way of the invention limiter piece.

FIG. 32 shows a top view of four invention hose supports 100, 100a, 101, and 101a in hinged connections and limited in angular expansion around said hinged connections by way of the invention limiter pieces 140. The living hinges of limiter pieces 140 permit the two legs to pivot with respect to each other and also allow the legs to pivot with respect to the free section and the section connected with the hose support.

Figure 33:
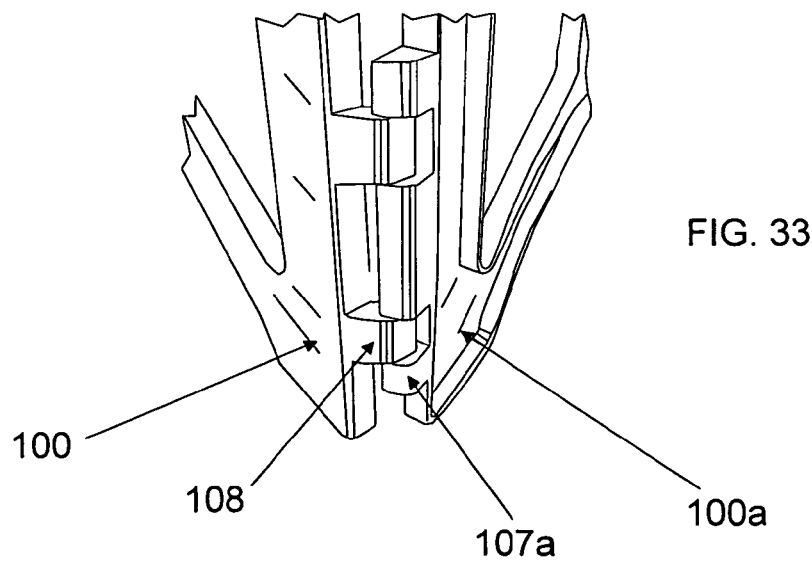
FIG. 33 shows a side perspective view of a lower hinge connection between two invention hose supports.
Figure 34:
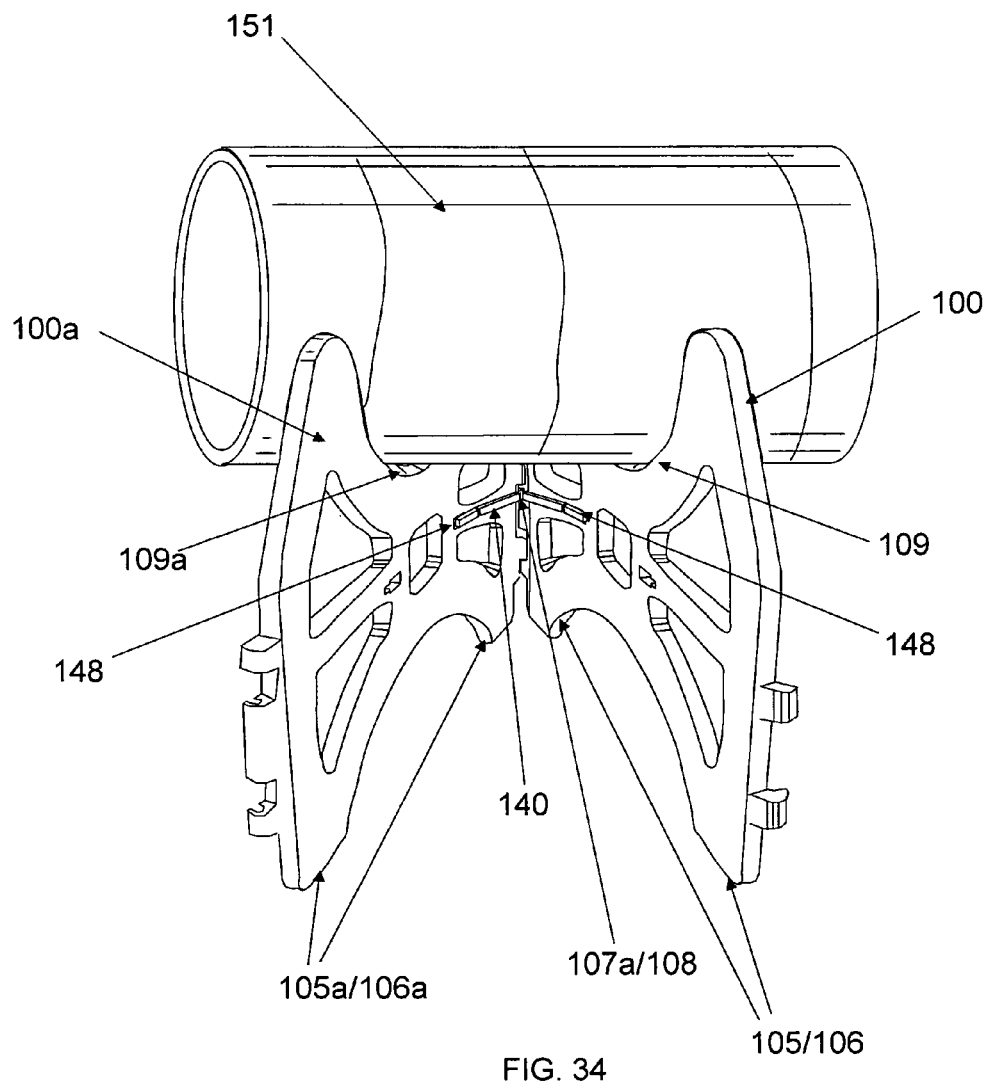
FIG. 34 is a side perspective view of an equal sized pair of invention hinge supports joined at a hinge and limited in angular expansion around that hinge by way of the invention limiter piece, where the hose supports support a flexible sewer hose for a recreational vehicle.

FIG. 33 shows a side perspective view of a lower hinge connection between two invention hose supports. FIG. 34 is a side perspective view of an equal sized pair of invention hinge supports joined at a hinge and limited in angular expansion around that hinge by way of the invention limiter piece 140, where the hose supports 100 and 100a support a flexible sewer hose 151 in cradle support surfaces 109 and 109*a*, where footings 105/106 and 105*a*/106*a* rest upon a ground surface.

The limiter pieces can restrict expansion of the hose supports to, preferably, from 25 to 45 degrees around their hinge connections. In a preferred embodiment, the assembly comprises 10 to 400 hose supports, preferably 30, in pairs of equal cradle support elevation, which each pair having a cradle elevation 0.25 to 0.5 inches less than the adjacent pair of hose supports, where the highest cradle support elevation is 7.5 inches and the lowest cradle elevation support is 4 inches and side support elevations for the cradle supports is from 6.25 to 9.75 inches. Further in this embodiment, the hose supports of FIGS. 1 and 8 form pairs of hose supports with cradle support elevations from 4 to 5 inches and hose supports of FIGS. 17 through 25 generally show the structure of hose supports with cradle support elevations from 5.25 to 7.5 inches.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A hose support assembly for a flexible sewer hose adapted to extend at a substantially continuous downward incline from a valve connection with a sewage tank of a recreational vehicle to a stub conduit of a sewage system comprising:
   (a) four or more hose supports, each hose support comprising a frame of a right leg, a left leg, a top cradle, and a bottom arch, where a lower support strut extends horizontally between a lower portion of the right and left legs, two limiter openings are defined in said lower support strut so that one of the two limiter openings is located equidistant from a lateral edge of the right leg as the other limiter opening is located from a lateral edge of the left leg;
   (b) each hose support having hinges extending from lateral edges of the right and left legs so that each hose support is adapted to connect by hinges to an adjacent hose support;
   (c) three or more limiter pieces, each limiter piece comprising two legs connected by a living hinge to form a V-shape, where two free ends of the two legs each have end portions adapted to connect with a limiter opening; and
   (d) the hose supports being connected by hinges edge to edge of their adjacent legs so that the top cradle is directed upward when the bottom arch rests on the ground and each limiter piece connects a limiter opening on one hose support with a limiter opening on an adjacent hose support so that rotation of the adjacent hose supports around their hinge is limited.

2. The assembly of claim 1 wherein the hose supports comprise pairs of equal elevation of their cradle supports, and each pair are joined by a hinge.

3. The assembly of claim 1 wherein the hinge connections between adjacent hose supports form a vertex and a vertex of each limiter piece is directed toward said hinge connection.

4. The assembly of claim 1 wherein each end portion of the legs of the limiter pieces comprise a narrow extension that extends to a wide extension, whereby the narrow extension is lodged in a narrow slot of its limiter opening and the wide extension is located opposite a side of the lower support strut than the end portion to which it is connected.

5. The assembly of claim 1 wherein two or more of the hose supports comprise an upper support strut which extends from the right leg to the left leg and is located above the lower support strut.

6. The assembly of claim 1 wherein the limiter openings are located from one to three inches from the lateral edges of the right and left legs on the lower support strut.

7. The assembly of claim 6 wherein adjacent hose supports are limited to expanding angularly about their hinge connections no more that from 25 to 45 degrees.

* * * * *